Oct. 22, 1935.  H. A. TREBLER ET AL  2,018,332
IRRADIATING APPARATUS
Filed March 16, 1934  4 Sheets-Sheet 1
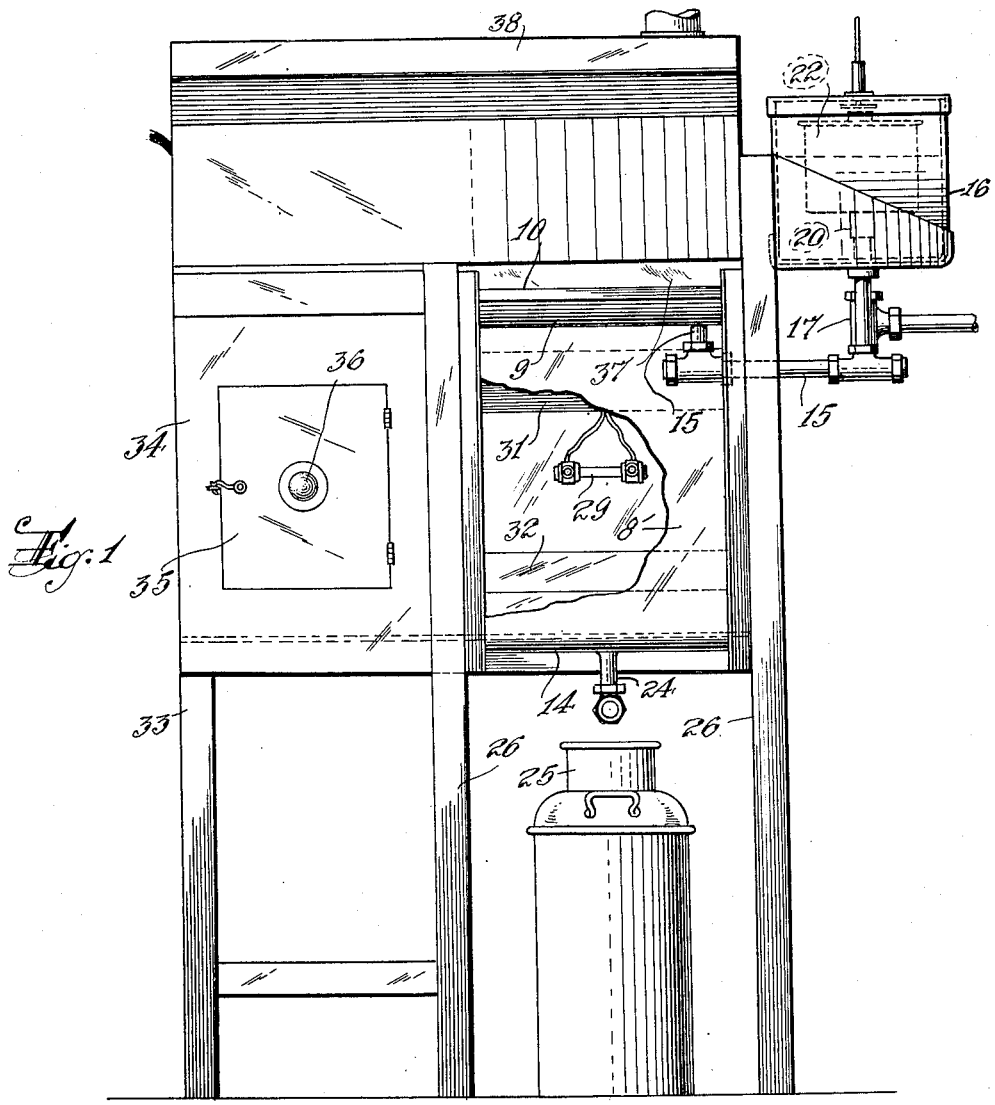
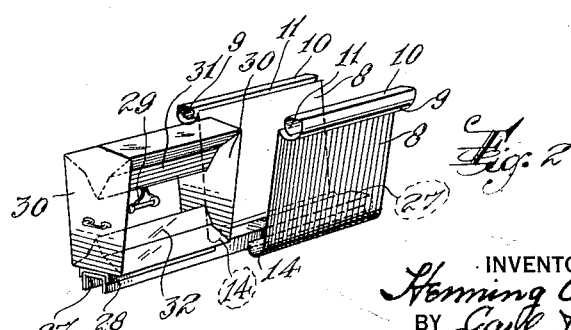

Oct. 22, 1935. H. A. TREBLER ET AL 2,018,332
IRRADIATING APPARATUS
Filed March 16, 1934    4 Sheets-Sheet 2
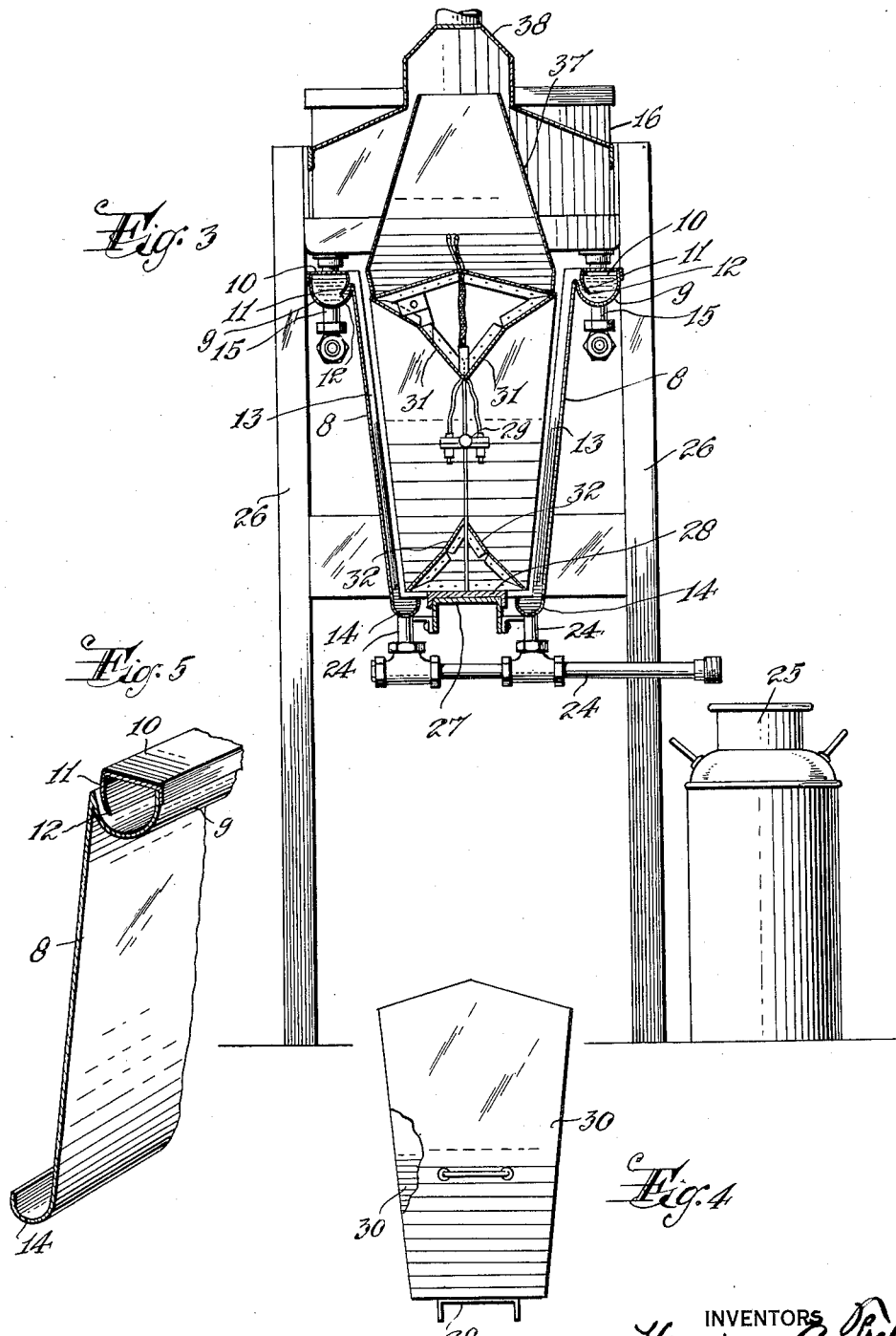

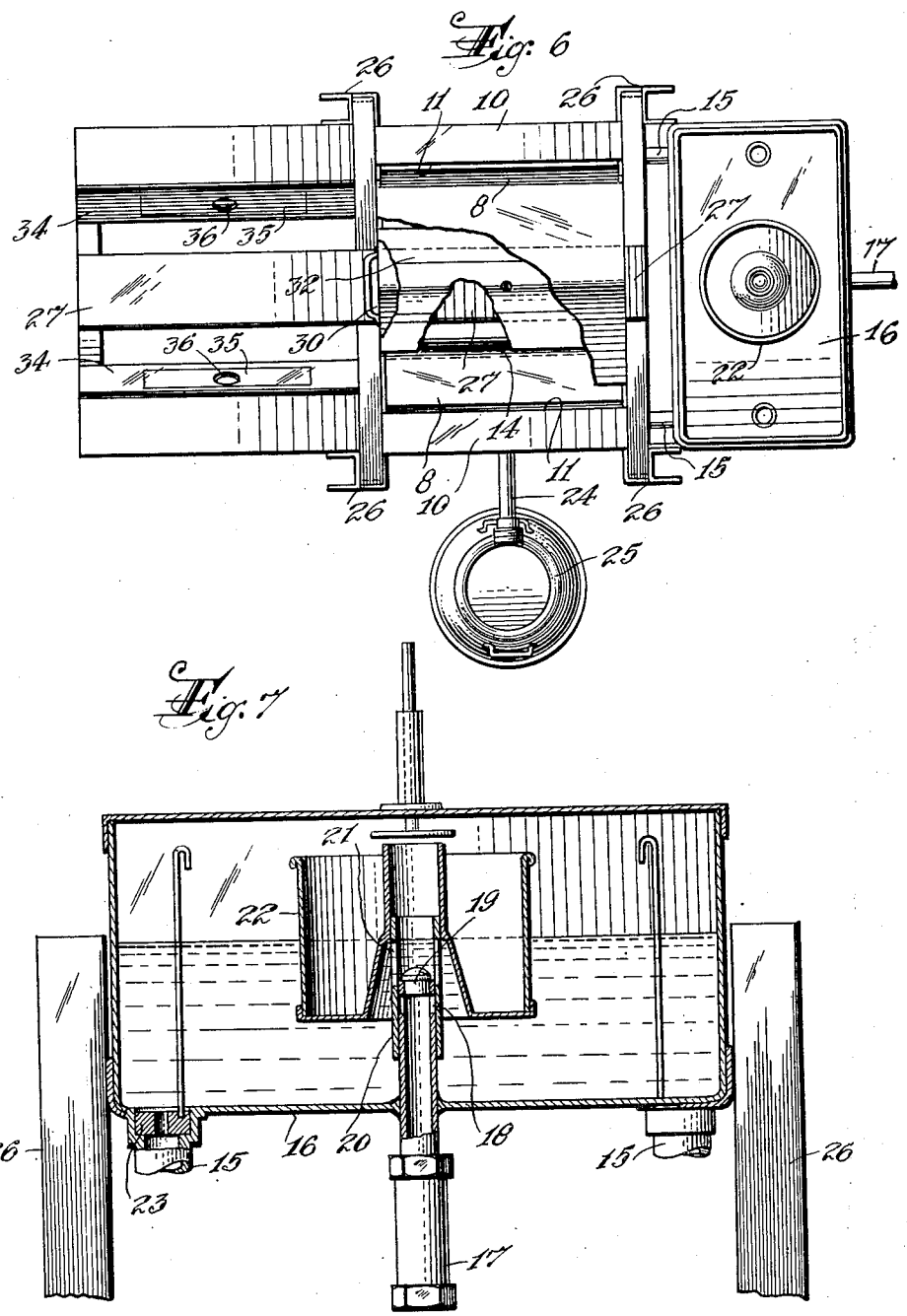

Oct. 22, 1935.   H. A. TREBLER ET AL   2,018,332
IRRADIATING APPARATUS
Filed March 16, 1934   4 Sheets-Sheet 4
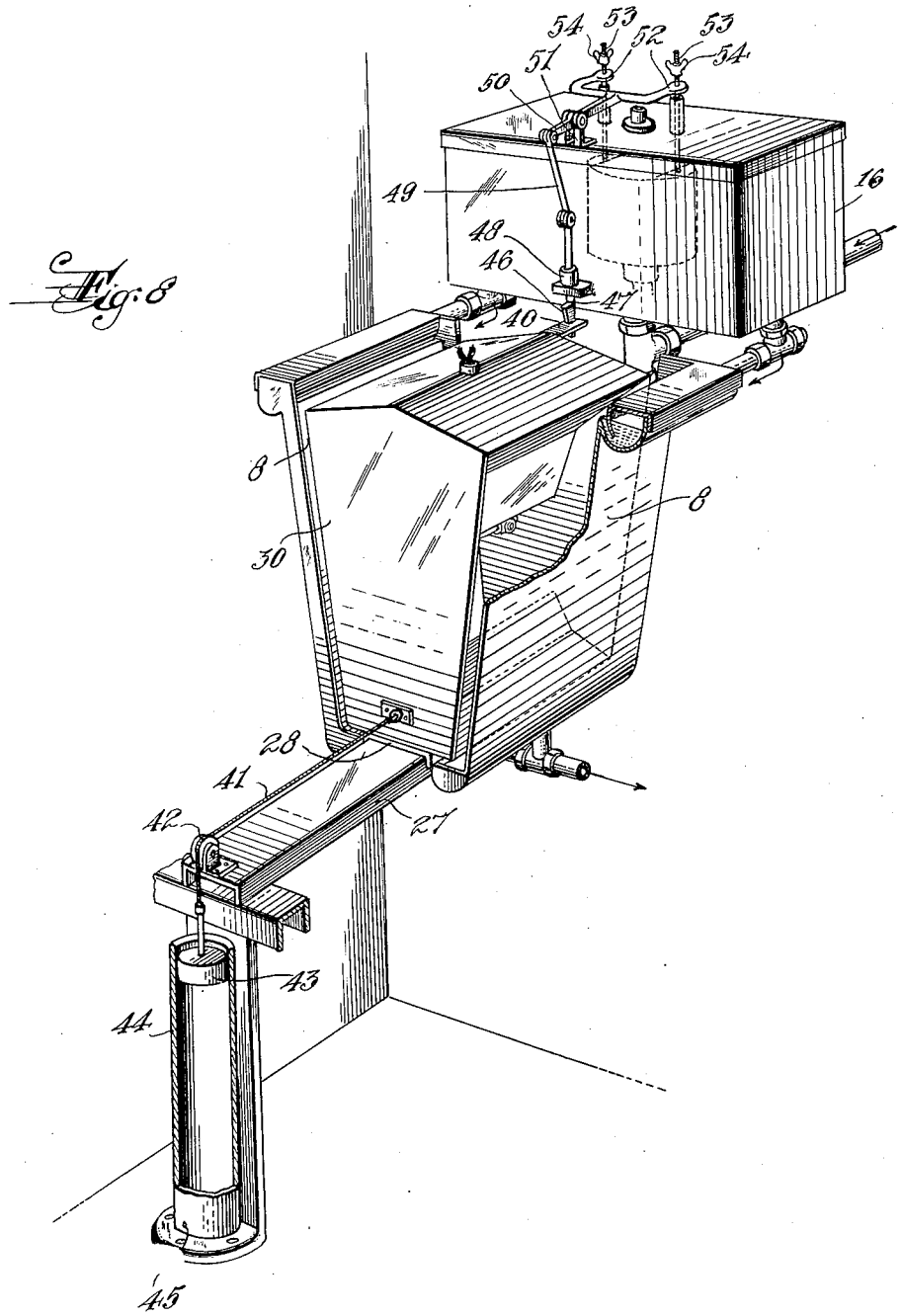

Patented Oct. 22, 1935

2,018,332

UNITED STATES PATENT OFFICE 2,018,332

IRRADIATING APPARATUS

Henning A. Trebler, Baltimore, Md., and Carl J. Larsen, East Orange, N. J., assignors to Hanovia Chemical and Manufacturing Company, Newark, N. J., a corporation of New Jersey Application March 16, 1934, Serial No. 715,814

4 Claims. (Cl. 99—2)

This invention relates to improvements in apparatus for the irradiation of milk and other fluids with electromagnetic radiations, particularly ultraviolet rays, for the production of vitamins, sterilization and the like.

Arcs between metals or in metal vapors are the most efficient sources for the production of the ultraviolet radiations employed in these irradiation processes. These arcs when initially operated, produce in their vicinity ozone, and, in the presence of metallic catalysts, nitrogen-oxygen compounds. The ability of these discharges to produce these gaseous compounds is much diminished after the generator has attained operating temperatures.

Heretofore, apparatus for the irradiation of milk and other fluids have comprised a fixed radiation generator facing a surface over which the fluids flow during the irradiation process. Such apparatus is objectionable in that when the radiation producing device is initially placed in operation, it is in the presence of the milk or other fluid and the latter will be contaminated by the ozone and other gases created by the radiation generator.

For sanitary reasons, especially with milk and other foodstuffs, it is well-known that cleanliness and sterility are essential. These are usually accomplished by the employment of an abundance of heated water and live steam. Apparatus which has been heretofore employed has been objectionable in that it has been very difficult to clean the various parts satisfactorily, especially the members over which the fluids flow, without endangering the parts of the radiation generators.

In one apparatus arrangement the cleansing of the members in contact with the fluids has been accomplished by a provision which permits the surface over which the milk flows to be partially dismantled and lowered from the radiation generator. While this procedure is satisfactory from the standpoint of cleanliness, it does not provide convenient access to the surfaces over which the milk or other fluid flows after the apparatus has been reassembled and prior to irradiation in order that a thin, uniform fluid flow can be insured.

It is the object of this invention to provide apparatus for the irradiation of milk and other fluids, said apparatus including means for insuring a proper distribution of the fluid flow before the light source is brought into the proximity with the milk film, means for conveniently moving the radiation generator into and out of the vicinity of the fluids being irradiated in order that they will not be contaminated by ozone and the oxides of nitrogen which are formed in particular abundance during the initial operation of the lamp before it reaches its full operating intensity, means for the removal of the light source, either manually or automatically, from the sphere of action provided the milk flow is interrupted, and means for maintaining the radiation source at full operating intensity and ready for use as soon as the milk flow is again reestablished.

A further object of our apparatus is the provision of a novel structure wherein the radiation generator is entirely independent of the members associated with the milk or other fluids whereby such members can be conveniently and thoroughly cleaned when desired.

A further object is the provision whereby the over-irradiation of certain parts of the milk film before an even distribution of the milk has been established is prevented. This provision is very important, for over-irradiated particles of milk would tend to adhere to the metal surfaces, tending to interfere with the formation and maintenance of a smooth thin flowing film and imparting to the milk undesirable flavors. Even a very small amount of over-irradiated milk is capable of contaminating and rendering unpalatable a large volume of otherwise satisfactory product.

These and other advantageous objects, which will later appear, are accomplished by the simple and practical construction and arrangement of parts hereinafter described and exhibited in the accompanying drawings, forming part hereof and in which:

Fig. 1 is an elevational view of our device for the irradiation of milk or other fluids with ultraviolet radiations, Fig. 2 is a perspective view generally showing the essential features of the device, Fig. 3 is an end elevational view in section, of the device, Fig. 4 is an end view of an ultraviolet ray generator supporting carriage used in the device, Fig. 5 is a perspective view partly in section, of a milk receiving and distributing device, Fig. 6 is a plan view of our apparatus with certain parts broken away to show the interior thereof, Fig. 7 is a sectional view of a valve for controlling the flow of milk in the device, and Fig. 8 is a perspective view of our apparatus, showing means for automatically controlling the operation thereof, in the event the supply of milk or other fluid falls below a predetermined quantity.

Referring to the drawings, in Fig. 3 there is shown a pair of spaced inclined flat sheets 8, preferably made of metal, and more clearly shown in Fig. 5, each of which has connected to the upper edge thereof a semi-circular trough 9, having a cover 10, provided with an arcuate flange 11, the latter having a knife edge 12 projecting into the trough 9 and a knife edge at the junction of trough 9 and sheet 8, all for the purpose of providing a thin smooth flowing film of milk free from air or gas bubbles, foam and coarse solid matter. The milk flows down sheet 8 and is retained on sheet 8 by means of flanges 13, and the lower edge of the sheet is turned upwardly to provide a lower trough 14 for receiving the milk after it has passed over sheet 8.

The milk is introduced into the trough 9 by means of piping 15, see Figs. 1 and 7, which is connected to a chamber 16, in which milk is introduced by a pipe 17 which extends up into the chamber and has adjacent to the end thereof a lateral orifice 18, the end of the pipe being closed by plug 19. Slidable on the pipe 17 is a sleeve 20 having a lateral orifice 21 arranged to coincide with the orifice 18 in the pipe 17. Attached to the sleeve 20 is a float 22; and when the float sinks to a predetermined level, the orifices 18 and 21 coincide, and milk is allowed to flow into the chamber.

The opening of the pipes 15 into the chamber 16 can be reduced by a plug 23 having a central passage of less diameter than pipe 15, when it is desired to decrease the rate of flow of milk from the chamber to the trough 9.

The lower troughs 14 are drained by pipes 24 into a suitable receptacle such as a milk can 25.

This arrangement of the apparatus in conjunction with the selection of the proper dimensions for the central passages or gates of plug 23 enables us to regulate and reproduce very accurately the thickness of the milk film and the velocity of flow in order that the maximum potency of action may be obtained without imparting to the milk any changes in flavor.

The flat sheets 8 are mounted upon a frame 26 in any convenient manner and between the lower part of the sheets 8 is arranged a track or guide device 27 in the form of an inverted U-shaped channel, which slidably receives a similar channel member 28, the latter supporting a carriage in which is mounted an ultraviolet ray generator.

The ultraviolet ray generator illustrated comprises a quartz mercury arc discharge 29 which is positioned preferably in the center of the carriage having end members 30 and angular directed upper and lower reflecting surfaces 31 and 32, which concentrate in certain directions rays emanating from the generator device 29.

Referring to Fig. 2, when the carriage is slid between the flat sheets 8, the ultraviolet rays are concentrated upon the sheets 8 by the reflectors 31 and 32 at the same time the end members 30 prevent the rays from escaping from the apparatus.

With our device, the radiation generator is placed in operation in a ventilated chamber remote from the metal plates 8 over which the milk is to flow. Any ozone formed during the initial operation of the generator is thereby removed and prevented from contacting the surfaces 8 in the irradiation chamber. After the milk flow has been established in a thin smooth film free from bubbles, foam and coarse particles, and after the radiation generator has attained operating conditions, the carriage upon which is mounted the generator and reflectors is moved into position between plates 8, and the milk passing over these surfaces is subjected to irradiation.

If it should be necessary to interrupt the milk flow, it will be necessary to cleanse the apparatus. The radiation generator is conveniently moved out of the irradiation chamber and into the adjacent light-tight chamber. This gives complete access to all parts of the apparatus which require cleaning and sterilization, both of which objects may be accomplished without endangering the generator.

The frame 26 has an extension 33 which supports the radiation generator housing. This housing 34 has a door 35 which permits access to the interior for adjustment and cleansing of the radiation producing device and the reflectors 31 and 32. When the door 35 is closed, the light generator may be observed through a window 36 constructed of an eye-protecting glass.

A hood 37 mounted over the reflector 31 facilitates the cooling of the equipment and conducts heated air and any gases through a flue 38.

In Fig. 8 is shown a device for controlling the position of the carriage in the event that the supply of milk becomes too low to enable the fluid to flow properly over the surfaces 8. It will be seen that the carriage is provided near the top thereof with a tongue 40 which has an aperture therein receiving a latch 46, which is integral with a rod 47 passing through a bracket 48 projecting from the wall of the chamber 16. The rod 47 is pivotally connected to a link 49, which is connected to the arm 50 of a lever supported by a bracket 51 mounted on the casing 16, the other arm of the lever having forks 52 with apertures therein through which pass rods 53 attached to the float 22. The upper ends of the rods 53 are threaded and provided with wing-nuts 54 to enable adjustment of the position of the forks 52 thereon.

When the proper amount of milk is in the chamber 16, the float is caused to rise to allow the rod 47 and latch 46 to descend and engage the tongue 40 to hold the carriage in proper position between the surfaces 8.

Attached to an end wall 39 of the carriage is a cable 41 which passes over the pulley 42 mounted on the track 27, the cable being also attached to a weight 43 in the form of a plunger moving in a cylinder 44, which has an aperture 45 near the lower end thereof to allow air to escape when the plunger 43 descends.

When the supply of milk in the chamber 16 falls below a predetermined quantity, the float 22 descends, and the wing-nuts 54 engage the forks 52 to rotate the lever and raise the latch 46 out of engagement with the tongue 40, so that the carriage can be moved by the weight 43 to a position away from the surfaces 8.

The foregoing disclosure is to be regarded as descriptive and illustrative only, and not as restrictive or limitative of the invention, of which obviously an embodiment may be constructed including many modifications. For example, the source of radiations may be moved vertically instead of horizontally, or a curtain or a shield may be interposed between the source of radiation and the irradiation surfaces, instead of moving the light source away. However this latter arrangement does not permit the ease of cleaning which is obtained by having the light source on a movable carriage.

Automatic provisions may be provided for the removal of the radiation source or interposing of the curtain when the liquid flow stops or falls below an established value. Automatic provision may be made for the prevention of the irradiation of the surface until after the latter has been adequately covered and protected by the liquid film. Automatic provision may be made to stop the milk flow when and if the ultraviolet source becomes extinguished in order that no unirradiated milk may become mixed with the activated product.

Having thus described our invention what we claim as new and desire to secure by Letters Patent, is:

1. In a device for the irradiation of liquids, a plurality of surfaces over which liquid is caused to flow, guide means mounted between said surfaces, a carriage slidably mounted on said guide means, a generator, producing activating radiations, mounted on said carriage, means for controlling the flow of the liquid over said surfaces, and means associated with said flow controlling means to enable the carriage to be automatically moved along said guide means when the supply of liquid falls below a predetermined point.

2. An apparatus for the irradiation of liquids, a surface over which the liquid is caused to flow, a float valve for controlling the flow of liquid over said surface, a carriage, a radiation-producing generator mounted on said carriage, means for guiding said carriage in proximity to said surface, latching means controlled by the position of the float valve for holding the carriage in proximity to said surface, and means for moving the carriage away from said surface when the latch is disengaged from the carriage.

3. In an apparatus for irradiating liquids with ultraviolet rays, a carriage, a track upon which the carriage is guided and moved, a source of ultraviolet rays mounted on the carriage, a compartment into which the carriage is moved during the starting of the source of ultraviolet rays, a surface over which the liquid being irradiated is caused to flow, means for maintaining said carriage in a predetermined position relative to said surface, and means for automatically releasing and moving the carriage into the compartment when the rate of flow of liquid falls below a predetermined amount.

4. In an apparatus for irradiating liquids with ultraviolet rays, a carriage, a track upon which the carriage is moved, a source of ultraviolet rays mounted on the carriage, a compartment into which the carriage is moved during the starting of the source of ultraviolet rays, a surface over which the liquid being irradiated is caused to flow, a reservoir for the liquid, a valve controlling the flow of the liquid from the reservoir to said surface, a float device controlling said valve so that when the liquid falls below a predetermined level in the reservoir the valve will be closed, a latch movably mounted on the reservoir, a tongue attached to the carriage and having a slot therein adapted to receive the latch to hold the carriage in a predetermined position, means associated with the float to release the latch from engagement with said tongue when the rate of flow of the liquid falls below a predetermined amount, a cable attached to one end of the carriage and passing over a pulley, and a weight attached to said cable to automatically move the carriage to a position remote from said surface when the latch is released.

HENNING A. TREBLER.
CARL J. LARSEN.